3,432,272
SAMPLE HANDLING SYSTEM FOR GASEOUS
ORGANIC CONTAMINANT DETECTOR
Karl H. Emich, Decatur, Ill., assignor to National Distillers & Chemical Corporation, New York, N.Y., a corporation of Virginia
Filed July 25, 1966, Ser. No. 567,551
U.S. Cl. 23—254    6 Claims
Int. Cl. G01n 31/10, 33/22

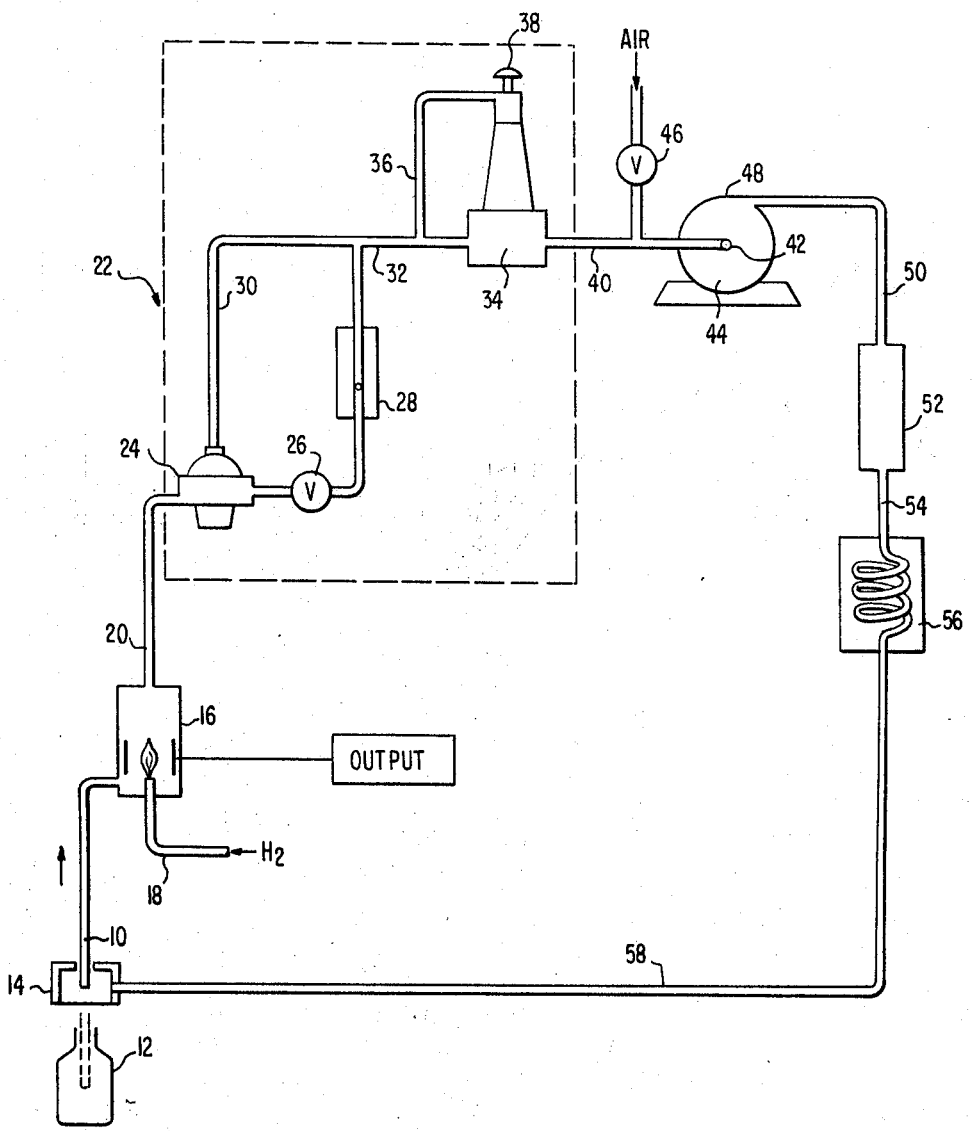

This invention relates to a unique and improved system for handling a gaseous sample provided to an organic contaminant detection unit of the flame ionization type which utilizes constant flow to the detection cell and provides an air curtain around the sample inlet.

In Patent 3,266,292, assigned to the assignee of this invention, there is described an organic contaminant detection system for detecting whether or not organic contaminants are present in open end containers. In such a system, in general, a probe intermittently dips into each of a succession of containers and continuously pulls atmosphere through the probe into a flame ionization type detection cell by means of vacuum applied through the cell and sample probe. When the probe has dipped into a container the atmosphere passed to the cell is a sample of the atmosphere within the container. When the probe moves up to allow another sample container to be positioned in sampling position and as atmosphere is continuously drawn through the probe, a contaminant free reference gas in the form of a curtain is supplied around the tip of the probe. This latter feature is disclosed in application Ser. No. 544,778, filed Apr. 25, 1966, assigned to the assignee of this invention.

The gas flow through the detection cell is of great importance to the sensitivity and stability of the instrument. That is, there must be a constant smooth flow of the sample and other gas taken in by the probe through the detection cell, because variations or fluctuations in the sample flow adversely affect the sensitivity of the cell and its stability. This invention provides a unique sample flow handling system to provide a constant flow without fluctuation through the sample cell.

Furthermore, in order to supply a contaminant free gas as an air curtain for the sample probe, it is necessary to obtain some gas which has no contaminant in it and to supply it under pressure adjacent the tip of the probe as the probe is withdrawn from the containers. Bottled contaminant free gas under pressure is not suitable for use in certain environments such as dairies where the contamination detector has its principal use. Previously a pump and a molecular sieve type filter were used to supply the air curtain contaminant free gas. This pump would be in addition to the pump withdrawing the vacuum through the probe and sample cell. This invention utilizes a closed loop gas handling system in which one single pump draws the vacuum through the probe and sample cell and supplies the contaminant free reference gas at the air curtain from the outlet of the sample pump while utilizing catalytic oxidation or other suitable means for removing the organic contaminants from the combustion products of the sample cell and ambient air which has been taken in by the pump.

Other features and advantages of the invention will be pointed out in the following description and claims and illustrated in the accompanying drawing, which disclose by way of example, the principle of the invention and the best mode which has been contemplated of applying that principle.

In the drawing:
The single figure is a schematic flow diagram of the sample handling system of this invention.

Referring to the drawing, the sample handling system of this invention is in the environment of a contaminant detection system such as disclosed in aforesaid Patent 3,266,292, with a means for supplying a contaminant free gas as an air curtain around the sample probe as described in aforesaid application Ser. No. 544,778, both assigned to the assignee of this invention.

A sample probe 10 may be movable from its full line position shown in the figure to its dotted line position wherein the tip of the probe is within a container 12. Vacuum is continuously applied to the probe to withdraw an atmospheric sample from the container 12 and when the probe is not within the container it is moved up to its full line position where it is surrounded by a contaminant free gas curtain from housing 14. When surrounded by contaminant free gas the probe 10 is not adversely affected if there should be contamination in the surrounding ambient.

The probe 10 is connected to a sample cell 16 of the flame ionization type utilizing hydrogen supplied through line 18 burning as a flame to which the atmospheric sample is introduced and the ionization of the flame caused by organic contaminants in the sample is utilized to provide an output with a very great degree of sensitivity. That is, a flame ionization cell of this type properly connected can detect contamination of a gaseous atmosphere within containers 12 to the order of about 60 parts per million of methane.

From the sample cell 16 the products of combustion pass out line 20 to a flow control apparatus 22 to provide a smooth constant flow through the cell without fluctuations. This flow control apparatus includes a differential relay flow valve 24, a needle valve 26, and a flow meter 28. The needle valve is set for a suitable restriction and a line 30 is connected back to the top of relay 24 in order to operate the relay. The relay may be a Conoflow H21 XT relay set for one and one-half pounds per square inch fixed differential or any other suitable relay. The relay and flow meter outlet is connected through line 32 to the inlet of a vacuum regulator 34. The vacuum regulator, which may be a Conoflow H20 VT regulator, has connection 36 for control and is adjustable through adjusting knob 38 to control and set the vacuum at its inlet, for example between 0 and 5 pounds per square inch vacuum. The outlet of vacuum regulator 34 is connected through line 40 the inlet 42 of pump 44. Ambient air can enter the line 40 through control restriction 46 which may be a valve, orifice or the like. Additional air is needed in the system because a higher flow than just the output of cell 16 is required in the contaminant free gas curtain chamber 14. The flow into the curtain 14 is approximately twice the flow through the sample cell 16.

From pump outlet 48 the combined flow of the products of combustion and air which entered through inlet 46 is passed to a suitable means for removing organic contaminants from such combined flow. It has been found that one such means particularly useful is a catalytic filter, utilizing the well known principle of catalytic oxidation, such as heated copper oxide or heated Hopcalite (the trademark of the catalyst manufactured by Mine Safety Appliances Company). Another means of effective hydrocarbon removal is highly activated carbon, which offers the advantage that it is effective at ambient temperature.

From the outlet of catalytic filter 52 the combined flow of organic contaminant free gas is cooled, for example by passing through a cooling coil 56 to cool it to about the ambient temperature and is then passed through line 58 back into the contaminant free gas curtain 14.

This system with the constant flow control apparatus has provided variations in the sample gas flow of less than 0.05 liter/minute through the flame ionization detector. The closed loop system having only one pump for pulling the vacuum on the sample probe 10 and its exhaust, augmented by an outside air supply supplying the air through a catalytic filter for hydrocarbon removal to the air curtain also aids in eliminating fluctuations in flow. Also, by locating the inlet orifice 46 between the vacuum regulator and pump a steadier flow is obtained through the sample cell further aiding in stabilization of the detector unit.

While the invention has been particularly shown and described with reference to a preferred embodiment thereof, it will be understood by those skilled in the art that various changes in form and details may be made therein without departing from the spirit and scope of the invention.

I claim:

1. A sample handling system for a gaseous organic contaminant detection unit of the type utilizing constant flow from a sampler provided with a standard contaminant-free atmosphere to a detection cell of the flame ionization type, the system comprising:
   (a) a flow control apparatus connected with the outlet of the detection cell,
   (b) a pump with its inlet connected by a line with the flow control apparatus,
   (c) a control opening in the line between the detection cell and the pump inlet for admitting additional air to the detection cell,
   (d) means for removing organic contaminants from the products of combustion and additional air pumped by the pump, said means connected with the outlet of the pump, and
   (e) a fluid conduit for connecting the contaminant removal means to a point adjacent the sampler to provide the standard contaminant-free atmosphere to the sampler.

2. A sample handling unit as in claim 1 wherein the flow control apparatus includes a differential relay, a needle valve, and a vacuum regulator in series between the outlet of detection cell and the inlet of the pump.

3. A sample handling system as in claim 2 wherein the control opening in the fluid communication system is between the vacuum regulator and the pump inlet.

4. A sample handling system as in claim 1 wherein the means for removing organic contaminants from the product of combustion is a catalytic oxidation type filter.

5. A sample handling system as in claim 4 wherein the catalytic oxidation type filter uses heated copper oxide.

6. A sample handling system as in claim 4 wherein the catalytic oxidation type filter uses activated carbon.

References Cited

UNITED STATES PATENTS 3,114,609   12/1963   Jones   23—253 XR
3,169,832   2/1965   Gallaway et al.

MORRIS O. WOLK, *Primary Examiner.*

R. E. SERWIN, *Assistant Examiner.*

U.S. Cl. X.R.

23—232